July 3, 1956
J. W. LIGHT
2,753,031
CENTRIFUGALLY RESPONSIVE COUPLINGS
Filed Oct. 15, 1952
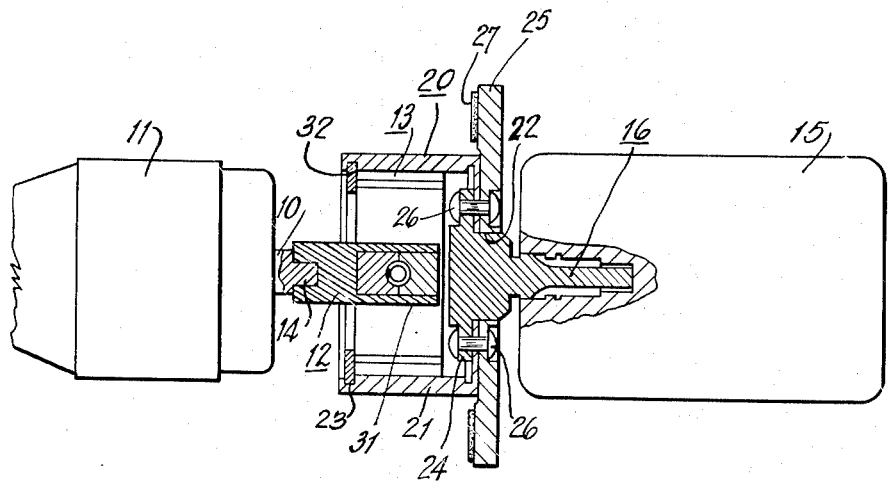
Fig. 1
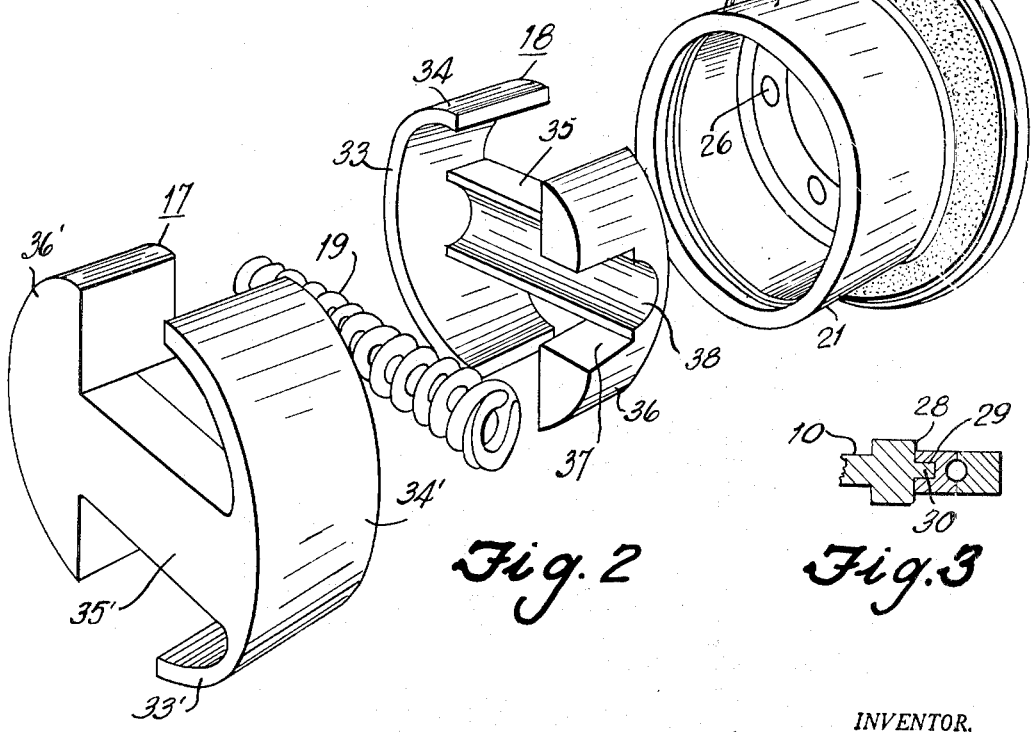
Fig. 2
Fig. 3
INVENTOR.
JAMES W. LIGHT
BY
Willits, Hardman and Felix
ATTORNEYS United States Patent Office 2,753,031
Patented July 3, 1956

2,753,031

CENTRIFUGALLY RESPONSIVE COUPLINGS

James W. Light, Greenville, Ohio, assignor to General Motors Corporation, Detroit, Mich., a corporation of Delaware Application October 15, 1952, Serial No. 314,888

10 Claims. (Cl. 192—104)

The present invention pertains to couplings, and particularly to a combined spring loaded and centrifugally modified friction coupling having torque limiting characteristics.

In power transmitting apparatus it is often desirable to maintain a non-slipping, friction driving connection between a motor and a load device from a standstill condition up to a predetermined driving torque or slip point after which slippage ensues between the driving and driven members of the coupling due to the imposition of an overload torque. The predetermined torque load resultant in slippage between the driving and driven members will hereinafter be referred to as the slip point. The coupling is preferably constructed and arranged to have a high thermal capacity whereby the continuous imposition of an overload will not result in harm to the coupling. This feature enables the coupling to be used as a protective device for the driving motor of the power transmitting apparatus. Accordingly, one of my objects is to provide a coupling of simple design and construction that may be continuously subjected to overloading without harm ensuing thereto.

The aforementioned and other objects are accomplished in this invention by providing a combined spring loaded and centrifugally modified clutch of high thermal capacity. Specifically, the clutch is constituted by five elements, namely: a driving tang; a pair of nested, arcuate shoe members; a spring; and a housing. The specific composition of the material constituting the shoe members and housing forms no part of the present invention. The nested, arcuate shoe members are coaxially disposed within the housing and retained therein by a snap ring. Opposite ends of the spring seat against the inner peripheries of the shoes and normally urge the shoes apart into frictional engagement with the inner periphery of the housing. Accordingly, a friction drive exists from standstill operation. The driving tang is operatively connected to the motor and engages an intermediate portion of the nested, arcuate shoe members. The housing is, in turn, operatively connected to any suitable load device, and the driving connection between the motor and the load device is maintained until the imposed load exceeds the combined loading of the spring and centrifugal force, in a centrifugally loaded type coupling, whereupon slippage upon the driving and driven member will ensue. In a centrifugally unloaded type coupling, slippage will ensue above a predetermined angular velocity upon the imposition of an overload.

Further objects and advantages of the present invention will be apparent from the following description, reference being had to the accompanying drawing wherein a preferred embodiment of the present invention is clearly shown.

In the drawing:

Fig. 1 is a composite view showing the novel coupling in section and the drive motor and load device in schematic form.

Fig. 2 is a view in exploded perspective of the principal elements of the novel coupling.

Fig. 3 is a fragmentary view illustrating a modified driving connection between motor shaft and nested shoes.

With particular reference to Fig. 1, a rotatable shaft 10 of a driving motor 11 is depicted as being rotatably connected to a driving tang 12 of a friction coupling 13 by means of a tongue and groove connection 14. The tang 12 is drivingly connected with the driving member of the coupling 13, and the driven member thereof is operatively connected to a load device 15 by a pinion member 16. The friction coupling 13 may be utilized to transmit torque from the motor driven shaft 10 to a load device comprising an actuator or other power transmitting device.

Referring more particularly to Figs. 1 and 2, the coupling 13 is constituted by five parts, namely: the driving tang 12; a pair of nested, arcuate shoe members 17 and 18; a coil spring 19; and a housing assembly 20. The housing assembly 20 includes a generally cup-shaped member 21 having a central opening 22 in the bottom wall thereof. Adjacent the open end of the cup-shaped member 21, an internal annular groove 23 is formed. The pinion member 16 projects through the opening 22 in a cup-shaped member 21.

The pinion member 16 has a flange portion 24 adjacent one end thereof, which is adapted to engage the inner surface of the bottom wall of the cup-shaped member 21. An annular member 25 is constructed to engage the outer surface of the bottom wall of cup-shaped member 21. The bottom wall of the cup-shaped member, the flange 24, and the annular member 25, each having a plurality of circumferentially spaced openings therethrough in alignment with the openings of the other members. A plurality of connectors 26, such as rivets, are inserted through the aligned openings in the members 16, 21 and 25, thereby interconnecting the several members to form the housing assembly 20.

In some installations it may be advisable to provide a braking surface for positively stopping rotation of the coupling driven member, in this case the housing, in which instance, an annular member 27 of suitable friction material is adhesively bonded to the member 25.

The driving tang 12 has a bifurcated portion 31. The nested, arcuate shoe members 17 and 18, assembled with the spring 19, are coaxially disposed within the cup-shaped member 21. The shoe assembly is retained within the cup-shaped member 21 by means of a snap ring 32 situated in the groove 23. The bifurcated portion 31 engages transversely extending portions of the nested shoes 17 and 18 such that rotation of the tang 12 by the motor driven shaft 10 will be transmitted to the shoes 17 and 18. The shoe assembly centers itself within the housing, but has limited freedom for slight axial movements therein.

As the construction and configuration of the shoe members 17 and 18 are identical, except for the fact that one is the mere image of the other in reverse, a detailed description of one of the shoe members is deemed to suffice, with similar parts of the other shoe member being denoted by similar numerals with primes affixed. The shoe member 18 comprises an arcuate portion 33 of less extent than 180°, which presents an external surface 34 for frictional engagement with the inner periphery of the cup-shaped member 21. A portion of the internal surface of the arcuate portion 33 is integral with a transversely extending rib 35, which is integral with an arcuate portion 36 diametrically opposing the arcuate portion 33, and likewise having an extent of substantially less than 180°. The arcuate portion 36 has an axially extending slot 37 formed therein presenting surfaces adapted for contiguous relation with the rib 35' of the shoe 17 when the shoes are assembled to form the assembly. Moreover, the rib 35 is formed with a semicircular groove 38 therein whereby when the shoes 17 and 18 are assembled in nested relation, the spring 19 may be accommodated in the complementary arcs of the semi-circular grooves of the ribs 35 and 35'. When the three component parts of the shoe assembly are assembled, namely, the two shoes 17 and 18 and the spring 19, opposite ends of the spring seat against the internal surfaces of the arcuate portions 33 and 33' of the members 17 and 18. Thus, when the shoe assembly is inserted in the cup-shaped member 21, the spring 19 urges the arcuate portions 33 and 33' of the shoe assembly into frictional engagement with the inner periphery of the cup-shaped member. In this manner the coupling will transmit torque from standstill operation.

As the portions 33 and 36 are located at different radial distances from the axis of rotation thereof, it is readily apparent that the modifying effects of centrifugal force, as regards loading of the clutch assembly, is determined by the relative masses of these portions. Accordingly, if it is desired to have centrifugal force assist the spring 19 in maintaining frictional engagement between the shoes and the housing, the mass of portion 33 must exceed that of portion 36. However, if it is desired to have centrifugal force oppose the spring 19 as the angular velocity increases, the mass of portion 36 must exceed that of portion 33 by a predetermined amount due to the difference in the position of the portions with respect to the axis of rotation. Thus the novel coupling may be constructed either as a centrifugally loaded or unloaded friction clutch. In actuator applications, it is preferable to design the coupling so that as the angular velocity increases, the frictional engagement or load carrying capacity decreases. Thus, centrifugal force may effect radial movement of the shoes 17 and 18 relative to each other in either direction depending upon the design characteristics thereof.

With particular reference to Fig. 3, a modified tang construction is depicted wherein the motor driven shaft 10 has a shoulder 28 thereon adapted to abut the end surface of the shoe 17, thereby limiting axial movement thereof. The shoe 17 has an axially extending recess 29, into which a tongue portion 30 of the shaft 10 extends to afford a driving connection.

Each of the shoes 17 and 18 is composed of cast iron and the cup-shaped member is composed of aluminum bronze, the particular composition of each member being disclosed and claimed in my copending application, Serial No. 314,887, filed of even date herewith. This composition, per se, forms no part of this invention, except for the fact that the composition of material of the driving and driven members is such that upon the imposition of an overload on the driven member of the coupling, slippage between the driving and driven members will ensue. Thus, the coupling is imbued with torque limiting characteristics. The driving and driven members are so designed that they may be operated under conditions of continuous overload for a substantial length of time without burning out. This feature is present by reason of the high thermal capacity of the alloys utilized in the driving and driven members, as more fully disclosed in the aforementioned copending application.

The friction coupling operates in the following manner: rotation of the driving member, constituted by the nested shoe assembly, will effect rotation of the driven member from a standstill due to the spring load effecting frictional engagement therebetween. This driving connection will be non-slipping and frictional in character between the motor 11 and the load device 15. The non-slipping driving connection will continue as long as the load imposed upon the driven member by the load device 15 does not exceed a predetermined value. However, upon the imposition of an overload upon the driven member, slippage will ensue between the driving and driven members of the coupling, whereby the coupling will act as a protective device preventing an overload from being imposed upon the driving motor 11. An overload which will cause slippage between the driving and driven members of the coupling is that load which exceeds the load tending to maintain frictional engagement therebetween caused by the spring 19 as modified by centrifugal force at the instantaneous angular velocity of the driven member.

It is readily apparent that this invention provides a combined spring loaded, centrifugally modified, torque limiting, friction coupling of exceedingly simple design and construction. Moreover, the several parts of the novel coupling may be so designed that the combined effects of spring loading and centrifugal modifying may be accurately correlated to a predetermined torque load at a predetermined angular velocity.

While the embodiment of the present invention as herein disclosed, constitutes a preferred form, it is to be understood that other forms might be adopted.

What is claimed is as follows:

1. A friction coupling including, driving and driven members, said driven member having a hollow cylindrical portion, said driving member comprising a pair of nested, arcuate shoes disposed within said hollow cylindrical portion, each shoe having a first arcuate portion engageable with the cylindrical portion of the driven member and a second arcuate portion opposed thereto, said arcuate portions being located different radial distances from the axis of rotation of the driving member, and resilient means normally urging said shoes into frictional engagement with said hollow cylindrical portion.

2. A friction coupling including, driving and driven members, said driven member having a hollow cylindrical portion, said driving member comprising a pair of nested, arcuate shoes disposed within said hollow cylindrical portion, each shoe having a first arcuate portion engageable with the cylindrical portion of the driven member and a second arcuate portion opposed thereto, said arcuate portions being located different radial distances from the axis of rotation of the driving member, and resilient means normally urging said shoes into frictional engagement with said hollow cylindrical portion, the frictional engagement between said driving and driven members being modified by centrifugal loading of the arcuate portions of said shoes during rotation of said driven member.

3. A friction coupling including, driving and driven members, said driven member having a hollow cylindrical portion, said driving member comprising a pair of nested, arcuate shoes disposed within said hollow cylindrical portion, each shoe having a first arcuate portion engageable with the cylindrical portion of the driven member and a second arcuate portion opposed thereto, said arcuate portions being located different radial distances from the axis of rotation of the driving member, the arcuate portions of each shoe being interconnected by a rib having a groove therein, and resilient means disposed within the complementary grooves of said ribs for urging said shoes into frictional engagement with said hollow cylindrical portion.

4. A friction coupling including, driving and driven members, said driven member having a hollow cylindrical portion, said driving member comprising a pair of nested, arcuate shoes disposed within said hollow cylindrical portion, each shoe having a first arcuate portion engageable with the cylindrical portion of the driven member and a second arcuate portion opposed thereto, said arcuate portions being located different radial distances from the axis of rotation of the driving member, resilient means normally urging said shoes into frictional engagement with said hollow cylindrical portion, and rotatable means operatively connected with said driving member for rotating the same.

5. A friction coupling including, driving and driven members, one of said members having a hollow cylindrical portion, the other of said members including a pair of arcuate shoes disposed within said cylindrical portion, each shoe having a first arcuate portion engageable with said cylindrical portion and a second arcuate portion opposed thereto, said arcuate portions being located different radial distances from the axis of rotation of said members, the arcuate portions of each shoe being interconnected by a rib, the second arcuate portion of each shoe having a slot which slidably receives the rib of the other shoe, and resilient means normally urging said shoes into frictional engagement with said hollow cylindrical portion.

6. The coupling set forth in claim 5 wherein the rib of each shoe has a groove therein, and wherein said resilient means comprises a spring disposed within the grooves of the ribs of said shoes, opposite ends of said spring acting directly upon the first arcuate portion of each shoe.

7. The coupling set forth in claim 5 wherein said other member includes a bifurcated tang which telescopically engages the ribs of said shoes.

8. A friction coupling assembly comprising, driving and driven members, one of said members having a hollow cylindrical portion, the other of said members including a pair of shoes disposed within said hollow cylindrical portion, each shoe having a first arcuate portion engageable with said cylindrical portion and a second arcuate portion opposed thereto, a transversely extending rib having a groove therein interconnecting the arcuate portions of each shoe, a single coil spring within the complementary grooves of said ribs for urging said shoes into frictional engagement with said hollow cylindrical portion, and means for operably holding said shoes in contiguous relation including a bifurcated member engaging each of said ribs.

9. A friction coupling assembly comprising, driving and driven members, one of said members having a hollow cylindrical portion, the other of said members including a pair of centrifugally movable arcuate shoes disposed within said hollow cylinder to be engageable therewith, an arcuate mass portion with each arcuate shoe complementary to the arcuate inner periphery of the other of said pair of shoes, a transversely extending rib having a groove therein interconnecting each shoe with its mass portion, spring means within the complementary grooves of said ribs for urging said shoes into frictional engagement with said hollow cylindrical member under static conditions, means retaining said shoes in nested relationship in said hollow cylindrical portion, and a member providing a tongue connection operably connected with one of said ribs, said mass portions centrifugally determining disengagement upon overload operation of said assembly.

10. The coupling assembly set forth in claim 8 wherein the hollow cylindrical portion is connected to an annular member, said member having a surface for positively stopping rotation thereof externally upon decoupling.

References Cited in the file of this patent

UNITED STATES PATENTS

| | | |
|---|---|---|
| 937,851 | Parker | Oct. 26, 1909 |
| 996,384 | Wiard | June 27, 1911 |
| 1,744,637 | Jacobs et al. | Jan. 21, 1930 |
| 1,787,648 | Waters | Jan. 6, 1931 |
| 1,823,912 | Nieman et al. | Sept. 22, 1931 |
| 2,521,943 | Pitt | Sept. 12, 1950 |
| 2,634,370 | Carlson | Apr. 7, 1953 |

FOREIGN PATENTS

| | | |
|---|---|---|
| 645,248 | Great Britain | Oct. 25, 1950 |
| 115,895 | Germany | Nov. 16, 1900 |